US009860711B2

(12) United States Patent
Xu et al.

(10) Patent No.: US 9,860,711 B2
(45) Date of Patent: Jan. 2, 2018

(54) RELAY TECHNIQUES SUITABLE FOR USER EQUIPMENT IN DOWNLINK

(75) Inventors: Hua Xu, Nepean (CA); Jianglei Ma, Kanata (CA); Hang Zhang, Nepean (CA); Ming Jia, Ottawa (CA); Peiying Zhu, Kanata (CA); Lai King Tee, San Diego, CA (US); Jun Li, Richardson, TX (US)

(73) Assignee: Apple Inc., Cupertino, CA (US)

( * ) Notice: Subject to any disclaimer, the term of this patent is extended or adjusted under 35 U.S.C. 154(b) by 602 days.

(21) Appl. No.: 13/126,226

(22) PCT Filed: Oct. 30, 2009

(86) PCT No.: PCT/US2009/005914
§ 371 (c)(1),
(2), (4) Date: Sep. 27, 2011

(87) PCT Pub. No.: WO2010/051033
PCT Pub. Date: May 6, 2010

(65) Prior Publication Data
US 2012/0163282 A1 Jun. 28, 2012

Related U.S. Application Data

(60) Provisional application No. 61/109,679, filed on Oct. 30, 2008.

(51) Int. Cl.
*H04W 4/06* (2009.01)
*H04B 7/26* (2006.01)
(Continued)

(52) U.S. Cl.
CPC ............ *H04W 4/06* (2013.01); *H04B 7/2606* (2013.01); *H04W 84/047* (2013.01);
(Continued)

(58) Field of Classification Search
CPC .... H04W 4/06; H04W 84/047; H04B 7/2606; H04B 7/14; H04L 5/0032; H04L 5/0053; H04L 5/0035
See application file for complete search history.

(56) References Cited

U.S. PATENT DOCUMENTS

| 7,248,841 | B2 | 7/2007 | Agee et al. |
| 7,957,327 | B2 | 6/2011 | Khandekar et al. |

(Continued)

FOREIGN PATENT DOCUMENTS

| CN | 101001098 | 7/2007 |
| CN | 101208917 | 6/2008 |

(Continued)

OTHER PUBLICATIONS

First Office Action and translation thereof in related Chinese Patent Application No. 200980143336.0, Jun. 5, 2013, pp. 1-16.
(Continued)

*Primary Examiner* — Omer S Mian
(74) *Attorney, Agent, or Firm* — Meyertons, Hood, Kivlin, Kowert & Goetzel, P.C.

(57) ABSTRACT

The present invention provides a solution to improve coverage and cell edge performance in a mobile user communication system is the use of fixed relays, which are pieces of infrastructure without a wired backhaul connection. The relays transmit or "relay" downlink messages between the base station (BS) and mobile stations (MSs) through a multi-hop communication. The present invention is a method and system for supporting a multiple user mobile broadband communication network that includes relay techniques suitable for user equipment in the downlink communication to the user equipment.

18 Claims, 9 Drawing Sheets

(51) Int. Cl.
*H04W 84/04* (2009.01)
*H04L 25/02* (2006.01)
*H04L 27/26* (2006.01)
*H04W 92/04* (2009.01)

(52) U.S. Cl.
CPC ........ *H04L 25/023* (2013.01); *H04L 27/2647* (2013.01); *H04W 92/045* (2013.01)

(56) References Cited

U.S. PATENT DOCUMENTS

| | | | | |
|---|---|---|---|---|
| 8,971,285 | B2* | 3/2015 | Kim | H04B 7/2606 370/280 |
| 9,515,792 | B2* | 12/2016 | Raaf | H04B 7/15542 |
| 2004/0228330 | A1 | 11/2004 | Kubler et al. | |
| 2005/0003831 | A1 | 1/2005 | Anderson | |
| 2008/0227386 | A1 | 9/2008 | Dayal et al. | |
| 2008/0256641 | A1* | 10/2008 | Lo | G06F 21/10 726/26 |
| 2010/0008282 | A1* | 1/2010 | Bhattad | H04J 11/0069 370/312 |
| 2010/0046413 | A1* | 2/2010 | Jin et al. | 370/315 |
| 2010/0177645 | A1* | 7/2010 | Kang et al. | 370/252 |
| 2010/0246475 | A1* | 9/2010 | Naden | H04B 7/155 370/315 |
| 2011/0222428 | A1* | 9/2011 | Charbit | H04B 7/15557 370/252 |
| 2013/0242959 | A1* | 9/2013 | Bhattad | H04J 11/0069 370/336 |
| 2015/0055545 | A1* | 2/2015 | Palanki | H04B 7/2606 370/312 |

FOREIGN PATENT DOCUMENTS

| | | |
|---|---|---|
| EP | 1848124 | 10/2007 |
| RU | 2342800 | 12/2008 |
| WO | 2007069848 | 6/2007 |
| WO | 2007079696 A1 | 7/2007 |
| WO | 2008128203 | 10/2008 |

OTHER PUBLICATIONS

International Searching Authority: Notification of Transmittal of the International Search Report, Written Opinion of Int'l Searching Authority, or the Declaration dated Dec. 30, 2009. cited by other.
International Searching Authority: Written Opinion of the International Searching Authority dated Dec. 30, 2009. cited by other.
International Searching Authority: International Search Report dated Dec. 30, 2009. cited by other.
Qualcomm Europe, Support of Rel-8 UEs by L TE-A Relays, 3GPP RAN WG1#54bis R1-084054, Oct. 3, 2008, URL, http://www.3gpp.org/ftp/tsg_ran/WG1_RL 1/TSGR1_54b/Docs/R1-084054.zip: pp. 1-18
LG Electronics, Network MIMO in L TE-Advanced, 3GPP TSG RAN WG1Meeting #54 R1-082942, Aug. 22, 2008, p. 1-p. 5 URL,http://www.3gpp.org/ftp/tsg_ran/WG1_RL 1/TSGR1_54/Docs/R1-082942.zip, pp. 1-5.
Nortel Supporting relay for Rel-8 UE in downlink, 3GPP TSG-RAN1 Meeting #55 R1-084460, Nov. 14, 2008, p. 1-p. 6, URL, http://www.3gpp.org/ftp/tsg_ran/NG1_RL 1/TSGR1_55/Docs/R1-084460.zip, pp. 1-6.
Office Action from Chinese Patent Application No. 200980143336.0, mailed Jun. 5, 2013, (English Translation and Versions), pp. 1-16.
Office Action from Japanese Patent Application No. 2011-534522, mailed Jul. 17, 2013, (English Translation and Versions), pp. 1-10.
Office Action from Canadian Serial No. 2743513, issued Jul. 22, 2014, pp. 1-9.
Decision on Patent Grant from Russian Application No. 2412-199055RU/8132, mailed Apr. 29, 2014, pp. 1-18.
Extended European Search Report for European Patent Application No. 09823938.7, dated May 10, 2017, pp. 1-8.

* cited by examiner

RELAY TECHNIQUES SUITABLE FOR USER EQUIPMENT IN DOWNLINK

CROSS-REFERENCE TO RELATED APPLICATIONS

This application is related to Provisional Patent Application Ser. No. 61/109,679 filed on Oct. 30, 2008, and priority is claimed for this earlier filing under 35 U.S.C. §119(e). The Provisional patent application is also incorporated by reference into this utility patent application.

TECHNICAL FIELD OF THE INVENTION

This application relates to wireless communication techniques in general, and to relay techniques suitable for user equipment in downlink, in particular.

BACKGROUND OF THE INVENTION

There is an increasing demand on mobile wireless operators to provide voice and high-speed data services, and at the same time, these operators want to support more users per base station to reduce overall network costs and make the services affordable to subscribers. As a result, wireless systems that enable higher data rates and higher capacities to the user equipment are needed. The available spectrum for wireless services is limited, however, and the prior attempts to increase traffic within a fixed bandwidth have increased interference in the system and degraded signal quality.

Wireless communications networks are typically divided into cells, with each of the cells further divided into cell sectors. A base station is provided in each cell to enable wireless communications with mobile stations located within the cell. One problem existing in the prior art systems includes the situation where the transmission/reception of each user's signal becomes a source of interference to other users located in the same cell location on the network, making the overall system interference limited.

An effective way to increase efficiency of bandwidth usage and reduce this type of interference is to use multiple input-multiple output (MIMO) technology that supports multiple antennas at the transmitter and receiver. For a multiple antenna broadcast channel, such as the downlink on a cellular network, transmit/receive strategies have been developed to maximize the downlink throughput by splitting up the cell into multiple sectors and using sectorized antennas to simultaneously communicate with multiple users. Such sectorized antenna technology offers a significantly improved solution to reduce interference levels and improve the system capacity.

The sectorized antenna system is characterized by a centralized transmitter (cell site/tower) that simultaneously communicates with multiple receivers (user equipment, cell phone, etc.) that are involved in the communication session. With this technology, each user's signal is transmitted and received by the basestation only in the direction of that particular user. This allows the system to significantly reduce the overall interference in the system. A sectorized antenna system consists of an array of antennas that direct different transmission/reception beams toward each user in the system or different directions in the cellular network based on the user's location.

To improve the performance of a sectorized cell sector, schemes have been implemented using orthogonal frequency domain multiple access (OFDMA) systems. The various components on the system may be called different names depending on the nomenclature used on any particular network configuration or communication system. For instance, "user equipment" encompasses PC's on a cabled network, as well as other types of equipment coupled by wireless connectivity directly to the cellular network as can be experienced by various makes and models of mobile terminals ("cell phones") having various features and functionality, such as Internet access, e-mail, messaging services, and the like.

Further, the words "receiver" and "transmitter" may be referred to as "access point" (AP), "basestation," and "user" depending on which direction the communication is being transmitted and received. For example, an access point AP or a basestaion (eNodeB or eNB) is the transmitter and a user is the receiver for downlink environments, whereas an access point AP or a basestaion (eNodeB or eNB) is the receiver and a user is the transmitter for uplink environments. These terms (such as transmitter or receiver) are not meant to be restrictively defined, but could include various mobile communication units or transmission devices located on the network.

One of the main challenges faced by the current system developers is providing high throughput at the cell edge. Technologies like multiple input multiple output (MIMO), orthogonal frequency division multiplexing (OFDM), and advanced error control codes enhance per-link throughput, but these technologies do not solve the detrimental effects of interference at borders with other cells or at the cell edge.

Cell edge performance is becoming more important as cellular systems employ higher bandwidths with the same amount of transmit power, and the systems use higher carrier frequencies with infrastructure designed for lower carrier frequencies. New standards are needed for mobile broadband access that will meet the throughput and coverage requirements of a fourth generation cellular technology.

SUMMARY OF THE INVENTION

The present invention provides a solution to improve coverage and cell edge performance in a mobile user communication system is the use of fixed relays, which are pieces of infrastructure without a wired backhaul connection. The relays transmit or "relay" downlink messages between the base station (BS) and mobile stations (MSs) through a multi-hop communication. The present invention is a method and system for supporting a multiple user mobile broadband communication network that includes relay techniques suitable for user equipment in the downlink communication to the user equipment. Several specific relay techniques are addressed with respect to the specific embodiments shown in the accompanying drawing figures.

BRIEF DESCRIPTION OF THE DRAWINGS

Embodiments of the present application will now be described, by way of example only, with reference to the accompanying drawing figures, wherein.

Like reference numerals are used in different figures to denote similar elements.

DETAILED DESCRIPTION OF THE PREFERRED EMBODIMENTS

Figure 1:
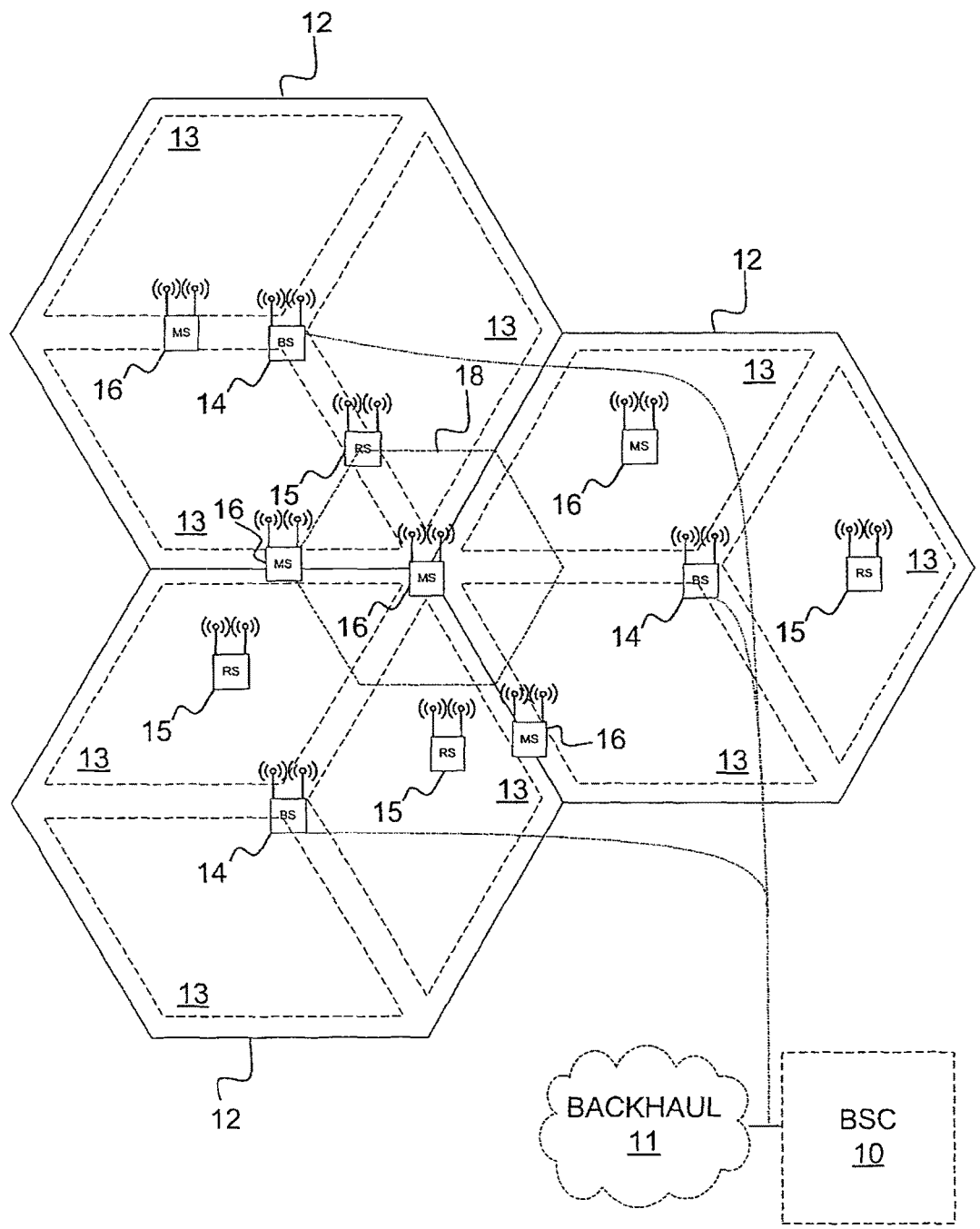
FIG. 1 is a block diagram of a cellular communication system.

Referring to the drawings, FIG. 1 shows a base station controller (BSC) 10 which controls wireless communications within multiple cells 12, which cells are served by corresponding basestations (BS) 14. In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions.

As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can be handed from any cell 12, sector 13 zone, base station 14 or relay 15 to another cell 12, sector 13 zone, base station 14 or relay 15. In some configurations, base stations 14 communicate with each and with another network (such as a core network or the internet, both not shown) over a backhaul network 11. In some configurations, a base station controller 10 is not needed.

Figure 2:
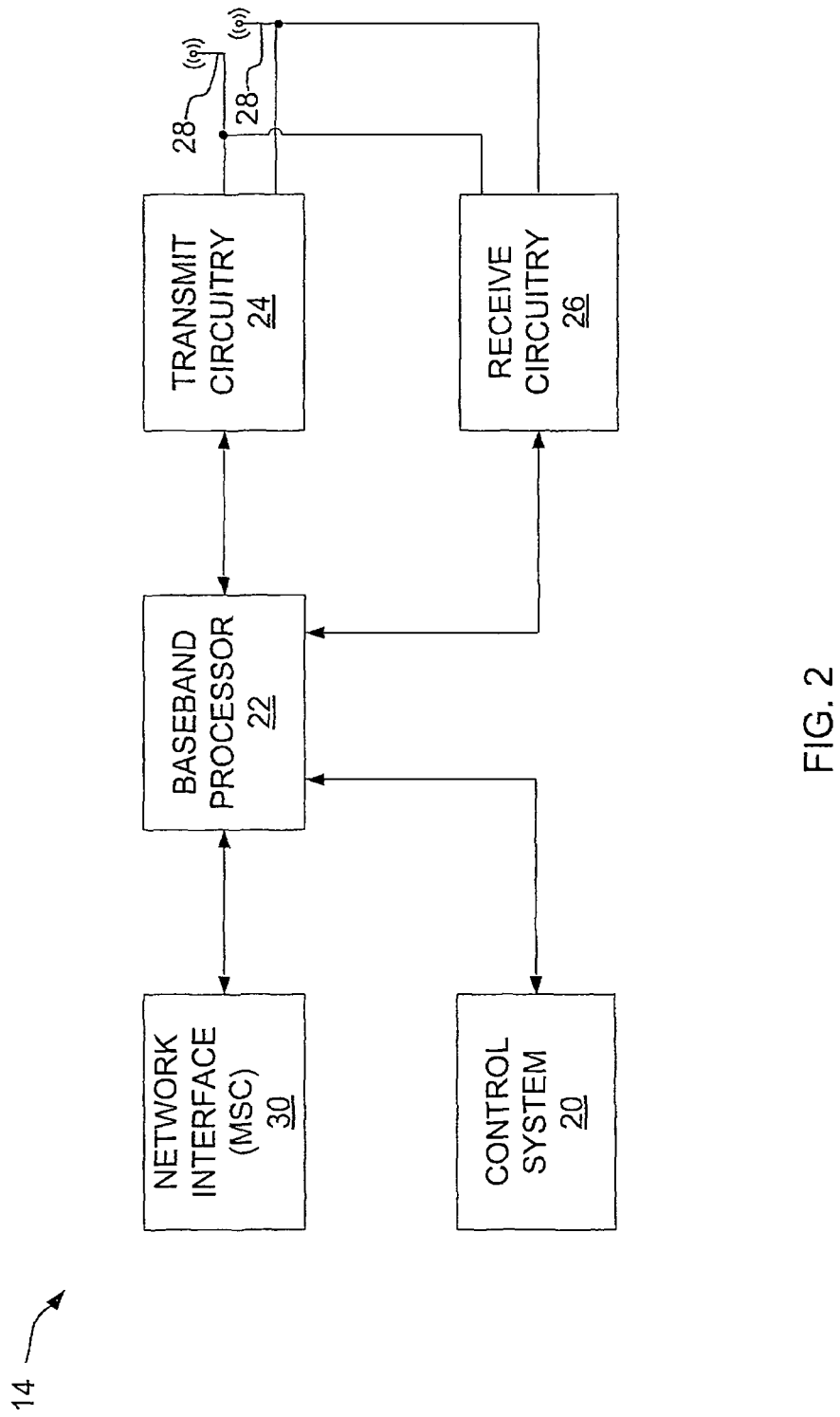
FIG. 2 is a block diagram of an example base station that might be used to implement some embodiments of the present application.

With reference to FIG. 2, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). In addition to the components shown in FIG. 2, a low noise amplifier and a filter may cooperate to amplify and remove broadband interference from the signal for processing. Further, downconversion and digitization circuitry will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
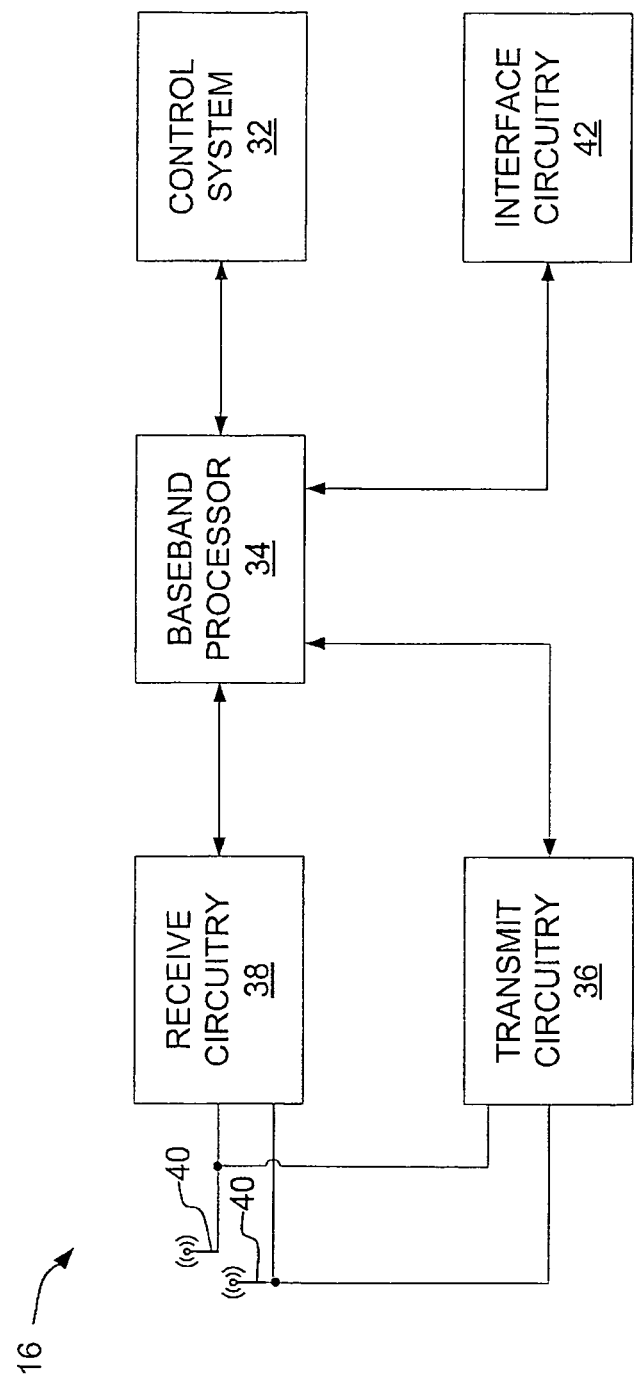
FIG. 3 is a block diagram of an example wireless terminal that might be used to implement some embodiments of the present application.

With reference to FIG. 3, an example of a mobile terminal 16 is illustrated. Similar to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1). Notably, the respective antennas can be used for reception and transmission using appropriate duplexers or switches and are so labeled only for clarity. When relay stations 15 are used, OFDM is preferably used for downlink transmission from the base stations 14 to the relays 15 and from relay stations 15 to the mobile terminals 16.

Figure 4:
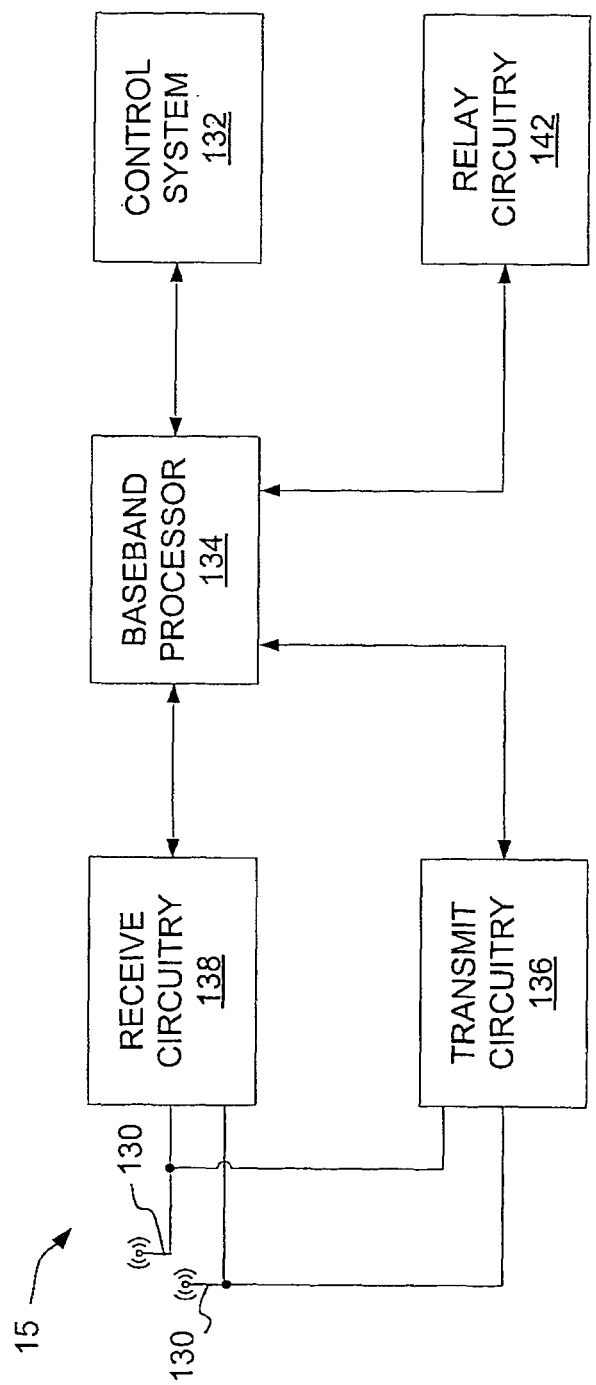
FIG. 4 is a block diagram of an example relay station that might be used to implement some embodiments of the present application.

With reference to FIG. 4, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 15 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
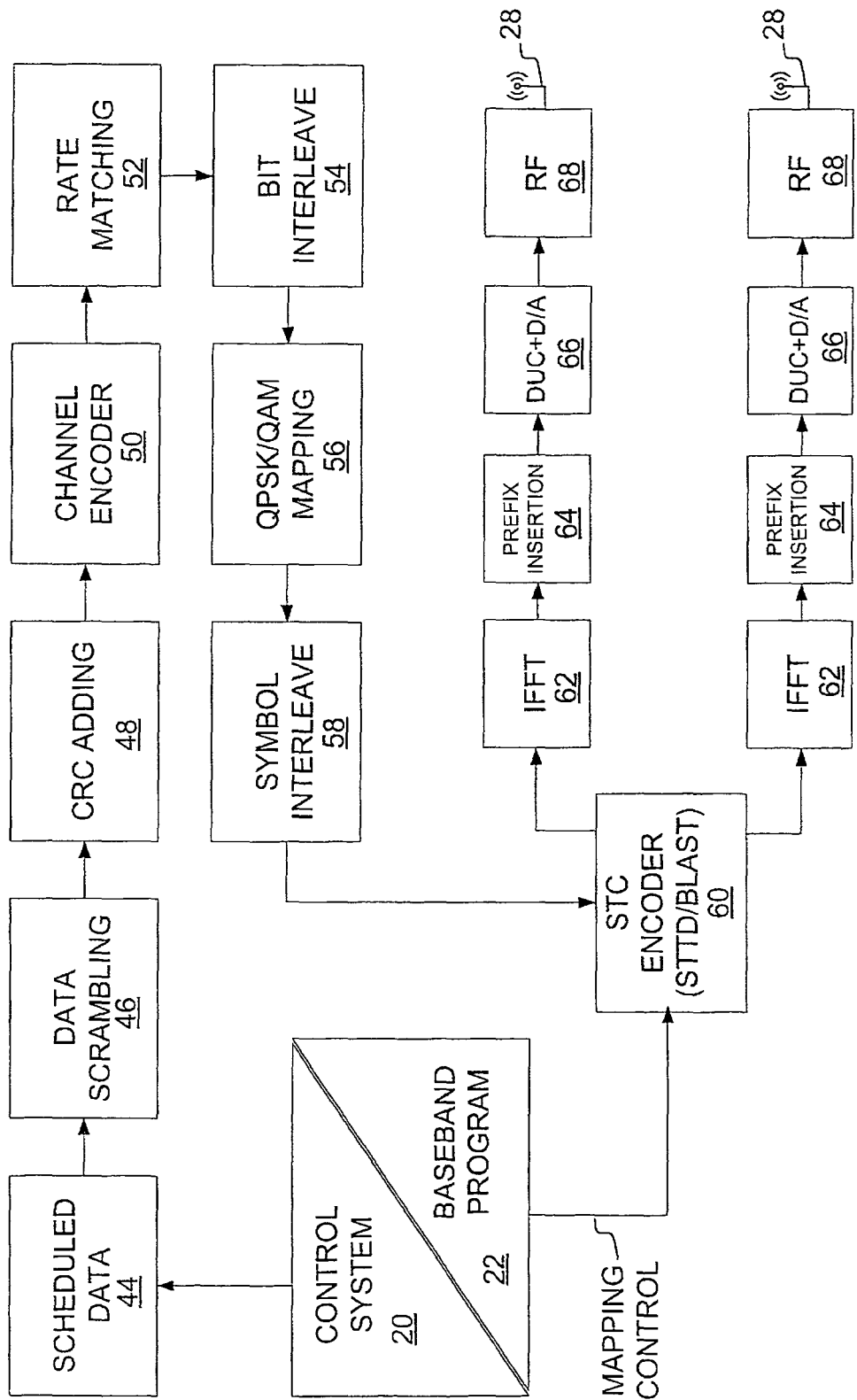
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16.

Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform.

The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
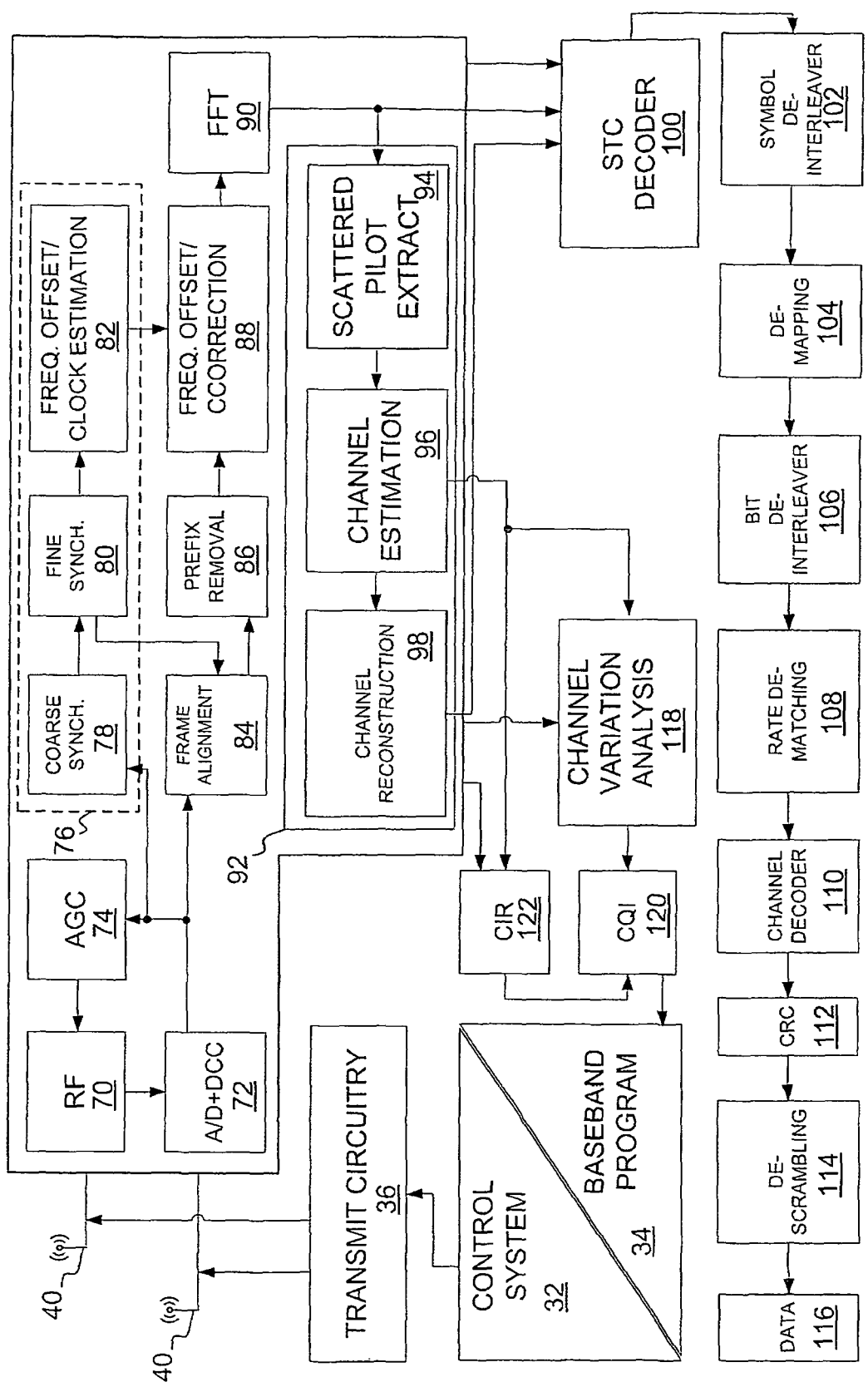
FIG. 6 is a block diagram of a logical breakdown of an example OFDM receiver architecture that might be used to implement some embodiments of the present application.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84.

Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency.

Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Figure 7A:
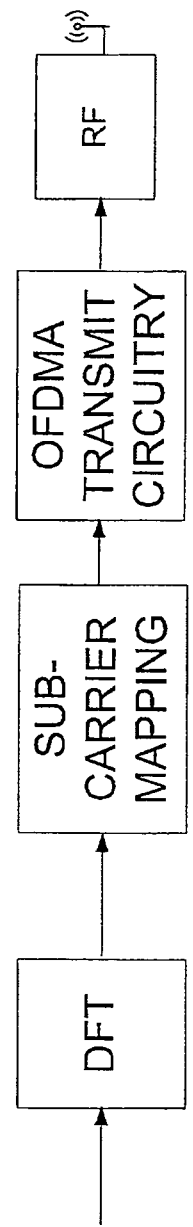
FIG. 7 is a block diagram of an SC-FDMA transmitter 7(a) and receiver 7(b) used to implement some embodiments of the present application.
Figure 7B:
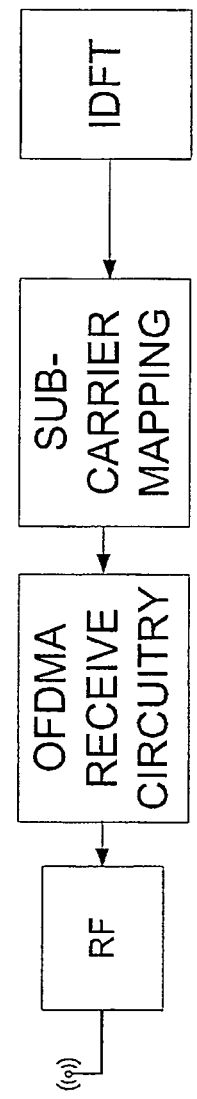

Referring to FIG. 7, an example SC-FDMA transmitter 7(*a*) and receiver 7(*b*) for single-in single-out (SISO) configuration is illustrated provided in accordance with one embodiment of the present application. In SISO, mobile stations transmit on one antenna and base stations and/or relay stations receive on one antenna. FIG. 7 illustrates the basic signal processing steps needed at the transmitter and receiver for the LTE SC-FDMA uplink.

In some embodiments, SC-FDMA (Single-Carrier Frequency Division Multiple Access) is used. SC-FDMA is a modulation and multiple access scheme introduced for the uplink of 3GPP Long Term Evolution (LTE) broadband wireless fourth generation (4G) air interface standards, and the like. SC-FDMA can be viewed as a DFT pre-coded OFDMA scheme, or, it can be viewed as a single carrier (SC) multiple access scheme. There are several similarities in the overall transceiver processing of SC-FDMA and OFDMA. Those common aspects between OFDMA and SC-FDMA are illustrated in the OFDMA TRANSMIT CIRCUITRY and OFDMA RECEIVE CIRCUITRY, as they would be obvious to a person having ordinary skill in the art in view of the present specification. SC-FDMA is distinctly different from OFDMA because of the DFT pre-coding of the modulated symbols, and the corresponding IDFT of the demodulated symbols. Because of this pre-coding, the SC-FDMA sub-carriers are not independently modulated as in the case of the OFDMA sub-carriers. As a result, PAPR of SCFDMA signal is lower than the PAPR of OFDMA signal. Lower PAPR greatly benefits the mobile terminal in terms of transmit power efficiency.

FIGS. 1 to 7 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Two alternative embodiments are disclosed in accordance to relay techniques suitable for user equipment in downlink. Both embodiments are particularly suitable for LTE Rel-8 system in downlink, and are described in that context in an exemplary fashion only as others skilled in the art may be able to apply the teachings of this disclosure to other standards in view of the present disclosure.

First Preferred Embodiment

For this embodiment, a new type of sub frame should be introduced in Rel-8 spec, which could be signalled to UE by a semi-static higher layer signalling. The location and periodicity of such sub frames can be configured through higher-layer signalling. In such sub frames, control region is referred as the first one or two OFDM symbols and data region is referred as the rest symbols in the sub frame.

Control signals for UEs served directly by eNB could be transmitted in the control region in such sub frames. eNB to relay node (RN) transmission can be scheduled together with PDSCH channels for UEs directly served by eNB and transmitted in data region of such sub frames.

Dedicated resource block (RB) could be reserved to convey control information for eNB to RN transmission. No new control channel is needed for eNB to RN transmission. Resource allocation for control information for RN can be statically or dynamically signaled to the RN, together with the configuration of the new sub frame, e.g., offset and periodicity.

Common reference signal (RS) and dedicated RS could be used for decoding eNB to RN transmission. RN transmits control signal and RS in control region of such sub frames to the UE it serves, for it to conduct channel measurement and estimation. RN receives and decodes eNB to RN transmission in data region of such sub frames. UE served by RN should not expect to decode and conduct channel measurement/estimation in data regions of such sub frames.

One radio is needed at RN for downlink. It transmits in the control region and receives in the data region in such sub frames.

Second Preferred Embodiment

In this second embodiment, there is no need to introduce new type of sub frame in Rel-8 spec. RN is treated as a UE and can be scheduled together with UE directly served by eNB. A high layer signal could be needed to inform the UE about the sub frames containing transmission from eNB to RN. However, that doesn't bring impact to Rel-8 UE.

For example, the location and periodicity of such sub frames can be configured through higher-layer signalling.

Similar to an UE, RN may also decode PDCCH to locate the data transmitted from eNB to RN, which may consists of some control information for the RN and the data to be relayed to the UE.

In sub frames when eNB transmits to RN, RN transmits control signal, along with RS in both control and data regions to the UE it serves using one radio transmitter, while simultaneously decode eNB to RN transmission in both control and data regions using a separate radio receiver.

In such sub frames when eNB transmits to RN, UE served by RN will not be scheduled for receiving data, but it could still conduct channel measurement/estimation based on RS transmitted from RN in both control and data regions.

No impact on Rel-8 standard with respect to UE behavior. Two radios are needed at RN for downlink, one for transmitting control signal, and RS throughout the sub frame, one for receiving transmission from the eNB. These two radios need good separations to reduce self-interference.

The solutions are trying to solve the problem that LTE Rel-8 UE be supported by the relay system specifically and other UE generically. The disclosure teaches how to enhance the performance for LTE system with the help of relay while minimizing the impact to the LTE spec and Rel-8 terminal. Some solutions to introduce relay for Rel-8 UE have also been proposed as follows.

Solution 1: Introducing Blank Subframes in Rel-8 Spec

Blank sub frames will be used for eNB and relay node (RN) transmission. UE won't decode these sub frames. Such blank sub frames could be signalled to UE through high layer signals like SIB. Such proposal would make the introduction of relays such as L2 relay to Rel-8 UE more easily in the future.

However, it requires the change of Rel-8 Spec to accommodate such new blank sub frames. That could delay the completion of Rel-8 Spec. As nothing is transmitted on these blank sub frames include RS, the impact to UE in terms of channel measurement and channel estimation is also unknown at this stage.

Figure 8:
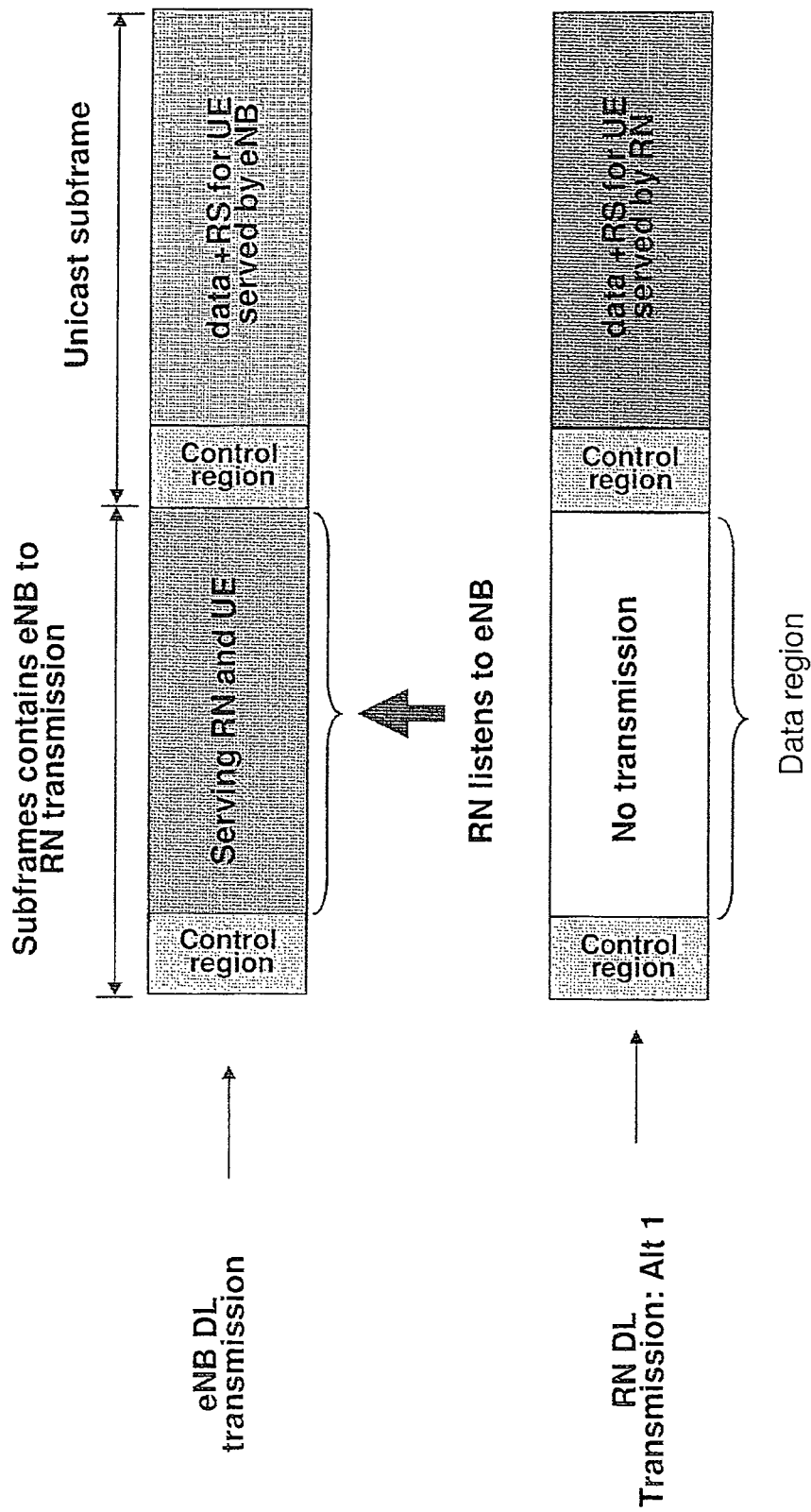
FIG. 8 are sub frame diagrams for eNB downlink and RN downlink according to the invention.

Introducing a new type of sub frame in Rel-8 spec similar as MBSFN sub frame, which is shown in FIG. 8. It uses up to two OFDM symbols as control region to transmit control signal to UE served directly by the eNB.

The rest of the symbols in the sub frame forms the data region and are used to transmit PDSCH channels between eNB and RN, and between eNB and UEs directly served by eNB. Some dedicated RBs could be reserved to transmit control information between eNB and RN. Therefore, no need to design new control channel for eNB to RN transmission.

Dedicated RS could be used for eNB to RN transmission. In this scenario, Common RS could still be transmitted from eNB for those UE directly served by eNBs to track the channel. Such new sub frames could be signalled by high layer signals using SIB, similar to that used for signalling MBSFN sub frames.

At RN side, in such sub frames, RN transmits control signal and RS to the UE it serves in the control region. In the data region, RN listens to eNB and decodes the transmission from eNB to RN. No transmission from RN in this region.

No UE served by the RN will be scheduled in such sub frames. UE could still conduct channel measurement and channel estimation based on RS in control region. Only one radio is needed at RN for downlink. In such new sub frames, it first transmits in control region and then receives in data region.

Spec change is needed for Rel-8 to introduce such new type of sub frames in which UE does not expect to do decoding and channel measurement/estimation in data region. However, as such sub frame is quite similar to MBSFN sub frame. The impact of introducing such sub frame into Rel8 should be very small. This can be viewed as compromised solution between solutions 1 and 2 proposed herein.

Solution 2: Reusing MBSFN Subframes to Support Relay

MBSFN sub frames could be used for transmission between eNB and RN. A new control signal could be defined to indicate that such sub frame is used for transmission between eNB and RN. New control channel and traffic channel could be defined for transmission between eNB and RN.

As PDCCH are still transmitted in first several symbols in MBSFN sub frames, they could be used to serve UE directly served by eNBs. However, this solution has less impact to the current Rel-8 spec as compared with the solution 1 as no new type of sub frame is introduced here.

Figure 9:
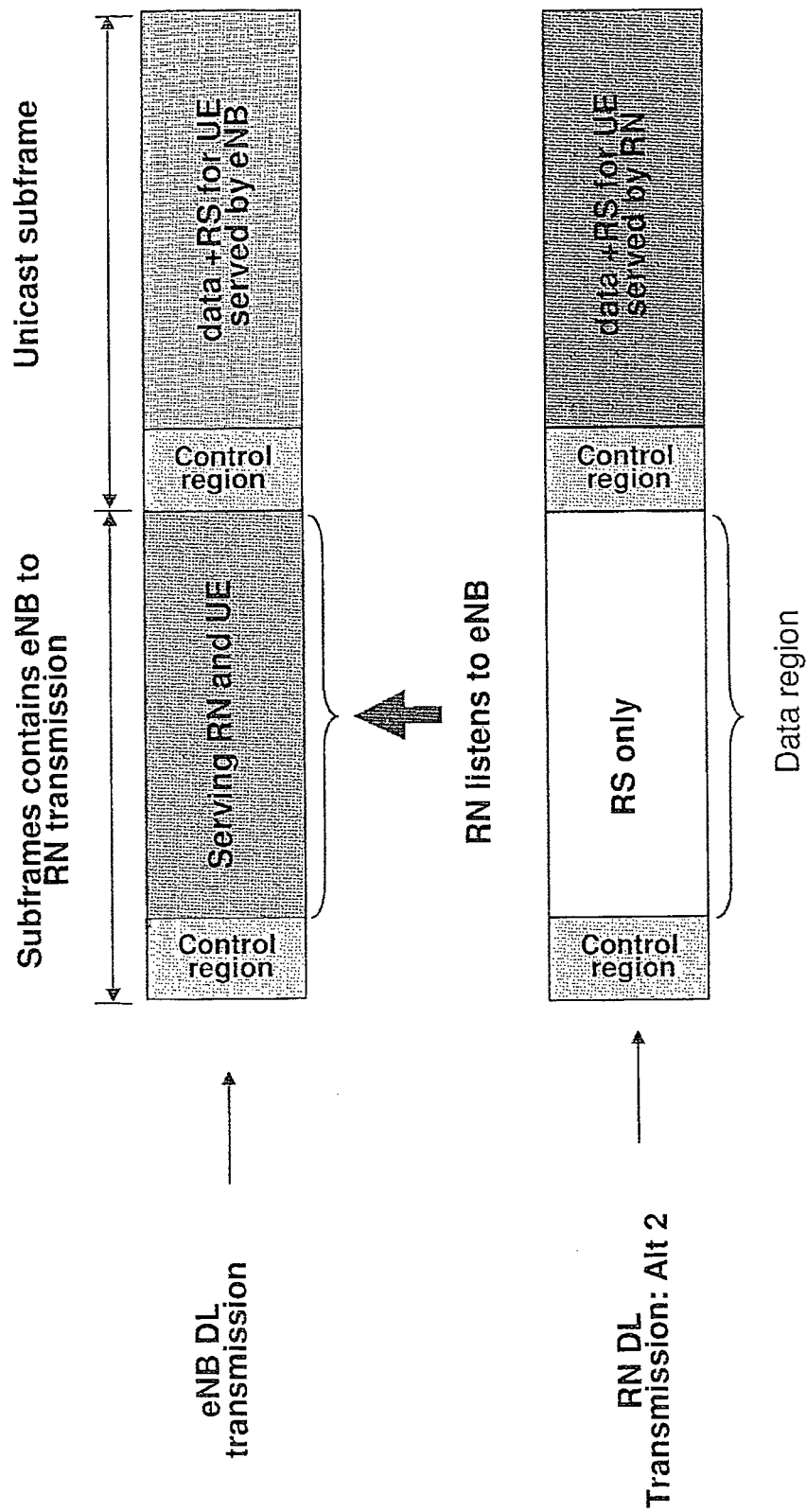
FIG. 9 are sub frames diagrams for eNB downlink and RN downlink according to the invention.

For this alternative, there is no need to introduce a new type of sub frame in Rel-8 spec because RN is treated as a UE and be scheduled together with other UE served directly by eNB as shown in FIG. 9. No extra L1 control signal is needed for eNB to RN transmission.

A dedicated RS could be used for eNB to RN transmission, and higher-layer signalling may be needed to inform RN the sub frames containing eNB to RN transmission. But that should not impact the Rel-8 UE. At RN side, in sub frames that contain transmission from eNB to RN. The RN transmits control signal, and RS in both control and data regions to the UE it serves.

No UE is served by the RN will be scheduled in these sub frames. However, DE could still conduct channel measurement and channel estimation based on RS in both control and data regions. RN listens to eNB in the data region and decodes the transmission from eNB to RN. If dedicated RS is used for transmission from eNB to RN, the interference on channel estimation could be reduced.

Two radios are needed at RN for downlink, one for receiving eNB to RN transmission in data region and one for transmitting control signal, along with RS in both control and data regions. Good separation is needed between these two radios to reduce self-interference. Sectorized or directional antennas could be used for each radio. This could add more implementation and deployment complexity for RN.

The above-described embodiments of the present application are intended to be examples only. Those of skill in the art may effect alterations, modifications and variations to the particular embodiments without departing from the scope of the application. In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A relay station comprised within a wireless radio communication system for communicating packet transmissions from a base station to a mobile unit, comprising:
    wireless communication circuitry, configured to perform wireless communication with the base station and the mobile unit; and
    processing hardware coupled to the wireless communication circuitry, wherein the processing hardware is configured to operate with the wireless communication circuitry to:
        receive a first transmission from the base station according to a wireless packet transmission protocol in a data region of a first downlink subframe, wherein the first downlink subframe is divided into a control region and the data region, the control region and data region being contiguous regions and the control region includes one or more orthogonal frequency division multiplexing (OFDM) symbols at the beginning of the first downlink subframe and remaining OFDM symbols of the first downlink subframe constitute the data region, wherein said first transmission received by the relay station comprises control information for the first transmission received by the relay station, and a first common reference signal for use in decoding the first transmission, wherein the control information for the first transmission is received in one or more dedicated resource blocks in the data region of the first subframe, wherein the one or more dedicated resource blocks are reserved to convey the control information, and wherein the processing hardware is further configured to:
        in a first configuration, prohibit the relay station from transmitting in the data region of the first downlink subframe, wherein the wireless communication circuitry is configured to use only one radio transceiver in the first configuration; and
        in a second configuration, transmit only reference signals in the data region of the first downlink subframe to the mobile unit, wherein the wireless communication circuitry is configured to use two separate radio transceivers in the second configuration;
        transmit a control signal and a second common reference signal to the mobile unit in the control region at the beginning of the first downlink subframe, wherein the mobile unit is configured to use the second common reference signal to perform channel measurement and channel estimation, wherein the processing hardware is further configured to prohibit the relay station from decoding transmissions from the base station in the control region of the first downlink subframe, and wherein, when the first configuration is configured, the mobile unit is further configured to prohibit decoding, conducting of channel measurement and estimation analysis in the data portion of the first downlink subframe, and wherein, when the second configuration is configured, the mobile unit is further configured to perform decoding, channel measurement and estimation analysis in the data portion of the first downlink subframe; and
        transmit to the mobile unit a third common reference signal in a control region of a second downlink subframe and a second transmission in data regions of the second downlink subframe, wherein the second downlink subframe is next in time to the first downlink subframe, and wherein the processing hardware is further configured to prohibit the relay station from receiving any signals in the second downlink subframe.

2. The wireless radio communication system according to claim 1 wherein the base station is configured to transmit control signals to a second mobile unit in said control region of the first downlink subframe.

3. The wireless radio communication system according to claim 1 wherein, in the second configuration, said relay station uses a first radio transmitter to transmit the control signal and the first reference signal and a second radio transmitter to receive transmissions from the base station.

4. The wireless radio communication system according to claim 1 wherein the first transmission further comprises a dedicated reference signal.

5. A method of communicating a packet transmission from a base station to a mobile unit served by a relay station, comprising:
receiving a first transmission from said base station at the relay station in a data region of a first downlink subframe, wherein the first downlink subframe is divided into a control region and the data region, the control region and data region being contiguous regions and the control region includes one or more orthogonal frequency division multiplexing (OFDM) symbols at the beginning of the first downlink subframe and remaining OFDM symbols of the first downlink subframe constitute the data region, wherein said first transmission received by the relay station comprises control information for the first transmission received by the relay station, and a first common reference signal for use in decoding the first transmission, wherein the control information for the transmission is received in one or more dedicated resource blocks in the data region of the first subframe, wherein the one or more dedicated resource blocks are reserved to convey the control information, wherein, in a first configuration, the relay station does not transmit in the data region of the first downlink subframe, wherein the relay station uses only one radio transceiver in the first configuration, wherein, in a second configuration, the relay station transmits only reference signals in the data region of the first downlink subframe to mobile unit, and wherein the relay station uses a second radio transceiver to transmit to the mobile unit in the first subframe in the second configuration;
transmitting from said relay station to said mobile unit a control signal and a second common reference signal in the control region at the beginning of the first downlink subframe, wherein the mobile unit is configured to use the second common reference signal to perform channel measurement and channel estimation, wherein the relay station does not attempt decoding of transmissions from the base station in the control region of the first downlink subframe, wherein, when the first configuration is configured, the mobile unit is further configured to not perform decoding nor conduct channel measurement and estimation analysis in the data portion of the first downlink subframe, and wherein, when the second configuration is configured, the mobile unit is further configured to perform decoding, channel measurement and estimation analysis in the data portion of the first downlink subframe; and
transmitting from said relay station to said mobile unit, a third common reference signal in a control region of a second downlink subframe and a second transmission in data regions of the second downlink subframe, wherein the second downlink subframe is next in time to the first downlink subframe, and wherein the relay station does not receive any signals in the second downlink subframe.

6. The method of communicating a packet transmission from a base station to a mobile unit according to claim 5 wherein the base station is configured to transmit control signals to a second mobile unit in said control region of the first downlink subframe.

7. The method of communicating a packet transmission from a base station to a mobile unit according to claim 5 wherein, in the second configuration, said relay station uses a first radio transceiver to transmit the control signal and the first common reference signal and a second radio transceiver to receive transmissions from the base station.

8. The method of communicating a packet transmission from a base station to a mobile unit according to claim 5 wherein the first transmission further comprises a dedicated reference signal.

9. An apparatus, comprising:
one or more processors coupled to wireless communication circuitry, wherein the one or more processors are configured to:
receive, via the wireless communication circuitry, a first transmission from a base station according to a wireless packet transmission protocol in a data region of a first downlink subframe, wherein the first downlink subframe is divided into a control region and the data region, the control region and data region being contiguous regions and the control region includes one or more orthogonal frequency division multiplexing (OFDM) symbols at the beginning of the first downlink subframe and remaining OFDM symbols of the first downlink subframe constitute the data region, wherein said transmission comprises control information for the first transmission, wherein the control information for the transmission is received in one or more dedicated resource blocks in the data region of the first subframe are reserved to convey the control information, and wherein the one or more processors are configured to:
in a first configuration, prohibit the apparatus from transmitting in the data region of the first downlink subframe, wherein the apparatus is configured to use only one radio transceiver in the first configuration; and
in a second configuration, transmit only control signals in the data region of the first downlink subframe to a mobile unit, wherein the apparatus is configured to use two separate radio transceivers in the second configuration;
transmit, via the wireless communication circuitry, a control signal and a second common reference signal to a mobile station in the control region at the beginning of the first downlink subframe, wherein the mobile station is configured to use the second reference signal to perform channel measurement and channel estimation, wherein the one or more processors are further configured to prohibit decoding of transmissions from the base station in the control region of the first downlink subframe, and wherein, when the first configuration is configured, the mobile station is further configured to prohibit decoding and conducting of channel measurement and estimation analysis in the data portion of the first downlink subframe, and wherein, when the second configuration is configured, the mobile station is further configured to perform decoding, channel measurement and estimation analysis in the data portion of the first downlink subframe; and
transmit, via the wireless communication circuitry, to the mobile station a third common reference signal in a control region of a second downlink subframe and a second transmission in data regions of the second downlink subframe, wherein the second downlink subframe is next in time to the first downlink subframe, and wherein the one or more processors are further configured to prohibit reception of any signals in the second downlink subframe.

10. The apparatus of claim 9, wherein the base station is configured to transmit control signals to a second mobile unit in said control region of the first downlink subframe.

11. The apparatus of claim 9, wherein said transmission has one dedicated resource block that is reserved to convey the control information to the apparatus.

12. The apparatus of claim 9, wherein, in the second configuration, the one or more processors are configured to use a first radio transmitter to transmit the control signal and a first reference signal and a second radio transmitter to receive transmissions from the base station.

13. The apparatus of claim 9, wherein the first transmission further comprises a dedicated reference signal.

14. The wireless radio communication system according to claim 1,
wherein subframes in which transmissions from the base station are received according to the wireless packet transmission protocol, including the first subframe, and resource allocation for the control information are indicated by higher-layer signaling received from the base station.

15. The method of communicating a packet transmission from a base station to a mobile unit according to claim 5, wherein subframes in which transmissions from the base station are received according to the wireless packet transmission protocol, including the first subframe, and the dedicated resource block for the control information are indicated by higher-layer signaling received from the base station.

16. The apparatus of claim 9,
wherein a location and periodicity of subframes in which transmissions from the base station are received according to the wireless packet transmission protocol, including the first subframe, and resource allocation for the control information are configured by higher-layer signaling received from the base station.

17. The wireless radio communication system according to claim 14,
wherein the higher-layer signaling received from the base station indicates a location and periodicity of the subframes in which transmissions from the base station are received according to the wireless packet transmission protocol.

18. The method of communicating a packet transmission from a base station to a mobile unit according to claim 15,
wherein the higher-layer signaling received from the base station indicates a location and periodicity of the subframes in which transmissions from the base station are received according to the wireless packet transmission protocol.

* * * * *

UNITED STATES PATENT AND TRADEMARK OFFICE
CERTIFICATE OF CORRECTION

PATENT NO. : 9,860,711 B2
APPLICATION NO. : 13/126226
DATED : January 2, 2018
INVENTOR(S) : Hua Xu et al.

It is certified that error appears in the above-identified patent and that said Letters Patent is hereby corrected as shown below:

In the Claims

Claim 1, Column 12, Lines 46-47, please delete "when the first configuration is configured" and substitute --in the first configuration--.

Claim 1, Column 12, Line 51, please delete "when the second configuration is configured" and substitute --in the second configuration--.

Claim 5, Column 13, Lines 48-49, please delete "when the first configuration is configured" and substitute --in the first configuration--.

Claim 5, Column 13, Line 53, please delete "when the second configuration is configured" and substitute --in the second configuration--.

Claim 9, Column 14, Line 57, please delete "when the first configuration is configured" and substitute --in the first configuration--.

Claim 9, Column 14, Lines 61-62, please delete "when the second configuration is configured" and substitute --in the second configuration--.

Signed and Sealed this
Fourteenth Day of August, 2018

Andrei Iancu
*Director of the United States Patent and Trademark Office*